(12) United States Patent
Chadha et al.

(10) Patent No.: US 12,254,461 B2
(45) Date of Patent: Mar. 18, 2025

(54) DYNAMIC VIRTUAL TRANSACTION CARD MANAGEMENT SYSTEM

(71) Applicant: Capital One Services, LLC, McLean, VA (US)

(72) Inventors: Mohak Chadha, San Francisco, CA (US); Allison Fenichel, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 231 days.

(21) Appl. No.: 18/071,727

(22) Filed: Nov. 30, 2022

(65) Prior Publication Data

US 2024/0177138 A1 May 30, 2024

(51) Int. Cl.
*G06Q 20/34* (2012.01)
*G06Q 20/20* (2012.01)
*G06Q 20/32* (2012.01)
*G06Q 20/40* (2012.01)

(52) U.S. Cl.
CPC .......... *G06Q 20/351* (2013.01); *G06Q 20/20* (2013.01); *G06Q 20/3224* (2013.01); *G06Q 20/4015* (2020.05)

(58) Field of Classification Search
CPC .. G06Q 20/351; G06Q 20/20; G06Q 20/3224; G06Q 20/4015; G06Q 20/227; G06Q 20/36; G06Q 20/385
USPC ........................................................ 705/16
See application file for complete search history.

(56) References Cited

U.S. PATENT DOCUMENTS

| | | |
|---|---|---|
| 10,997,592 B1 | 5/2021 | Kurani |
| 2014/0258110 A1 | 9/2014 | Davis et al. |
| 2014/0289126 A1* | 9/2014 | Harvey .............. G06Q 30/0222 705/44 |
| 2015/0134540 A1 | 5/2015 | Law et al. |
| 2017/0076277 A1 | 3/2017 | Zhou et al. |
| 2017/0083899 A1* | 3/2017 | Gilbey ................. G06Q 20/327 |

(Continued)

OTHER PUBLICATIONS

Unknown. Visa recruits four new partners for plastic-focused Fintech Fast Track programme. ICT Monitor Worldwide; Amman. Dec. 4, 2019. (Year: 2019).*

(Continued)

*Primary Examiner* — Florian M Zeender
*Assistant Examiner* — Fawaad Haider
(74) *Attorney, Agent, or Firm* — Banner & Witcoff, Ltd.

(57) ABSTRACT

Methods, systems, and apparatuses are described herein for generating and managing virtual transaction cards based on mobile device location so as to provide transaction security during in-person transactions. A geographic location of a mobile device may be determined, a proximate merchant may be selected, and a virtual transaction card may be generated for that particular merchant. Data corresponding to that virtual transaction card may be deployed into a digital wallet device for use during transactions with point-of-sale devices. Use of the digital wallet device may be conditioned on geographic location, time, an unlock command from a mobile device, or the like. By providing such dynamically-generated and limited virtual transaction cards for in-person transactions, the threat of security vulnerabilities relating to point-of-sale systems may be mitigated.

20 Claims, 5 Drawing Sheets

(56) References Cited

U.S. PATENT DOCUMENTS

2021/0019733 A1* 1/2021 Taffer ................... G06Q 20/352
2022/0277396 A1* 9/2022 Pariseau ................. H04L 67/55

OTHER PUBLICATIONS

Feb. 12, 2024—(WO) International Search Report and Written Opinion—App No. PCT/US2023/080459.

* cited by examiner

DYNAMIC VIRTUAL TRANSACTION CARD MANAGEMENT SYSTEM

FIELD OF USE

Aspects of the disclosure relate generally to transaction security. More specifically, aspects of the disclosure may provide for the dynamic generation and deployment of virtual transaction cards.

BACKGROUND

Thanks in part to rapid developments in computer security, physical transactions (e.g., purchases of goods and/or services at a physical location using a physical transaction card such as a credit card or debit card) can be relatively riskier than virtual transactions (e.g., purchases of goods and/or services online). For example, an online shopper might be able to generate virtual transaction cards—that is, limited-use credit and/or debit cards—for specific transactions such that, should the virtual transaction card data be stolen and maliciously used, such malicious behavior would potentially be blocked and would not negatively impact the online shopper's financial accounts. Such abilities are generally not available in-person: for the vast majority of transactions that do not involve cash, shoppers still use personal credit and/or debit cards. This introduces significant risk: after all, if the shoppers' payment card data is stolen (e.g., by a malicious employee, through a card skimmer, or the like), then the shopper (and/or their bank) might be exposed to significant financial loss.

Aspects described herein may address these and other problems, and generally improve the safety of computer authentication systems by dynamically generating and providing access to virtual transaction cards which can be used by customers during physical transactions at particular merchants.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may leverage information about mobile device location and/or the availability of digital wallets to permit users to conduct significantly safer and more convenient in-person transactions using virtual transaction cards. Particularly, as will be elaborated further below; the present disclosure involves determining the geographic location of a mobile device, then using that location to identify a merchant nearby the mobile device. Based on identifying that merchant, the mobile device may request a virtual transaction card. That virtual transaction card might correspond to the identified merchant. For example, the virtual transaction card might be usable only at that identified merchant, but might ultimately be tied to an account of a user such that use of the virtual transaction card at the merchant (e.g., at a point-of-sale system of the merchant) might allow a shopper to pay for goods. To effectuate such payment, details about the virtual transaction card (such as a virtual transaction card number, virtual transaction card expiration date, zip code corresponding to the virtual transaction card, or the like) might be transmitted to a digital wallet and/or a credit card-like device that might be used along with a point-of-sale system. For example, a credit card-like computing device might be configured to receive a virtual transaction card number and implement it in a magnetic stripe such that, when a portion of the credit card-like computing device is swiped at a point-of-sale system, the device transmits the virtual transaction card number to the point-of-sale system.

More particularly, some aspects described herein may provide for a mobile device, configured to manage virtual financial cards that are each uniquely generated for a different merchant, that may determine, using a global positioning system (GPS) module, a geographic location of the mobile device. The mobile device may identify a first merchant by determining one or more merchants proximately located to the geographic location of the mobile device and selecting, from the one or more merchants, the first merchant. The mobile device may then send, to a remote server, a request for a virtual transaction card, wherein the request for the virtual transaction card comprises an indication of the first merchant and authentication credentials corresponding to a user associated with the mobile device. The mobile device may then receive, from the remote server and in response to the request, virtual transaction card data that comprises a virtual transaction card number corresponding to the first merchant. The mobile device may then provide the virtual transaction card data to a second device, wherein the second device is configured to be used with one or more point-of-sale systems associated with the first merchant to conduct one or more transactions with the first merchant.

Corresponding method, apparatus, systems, and non-transitory computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
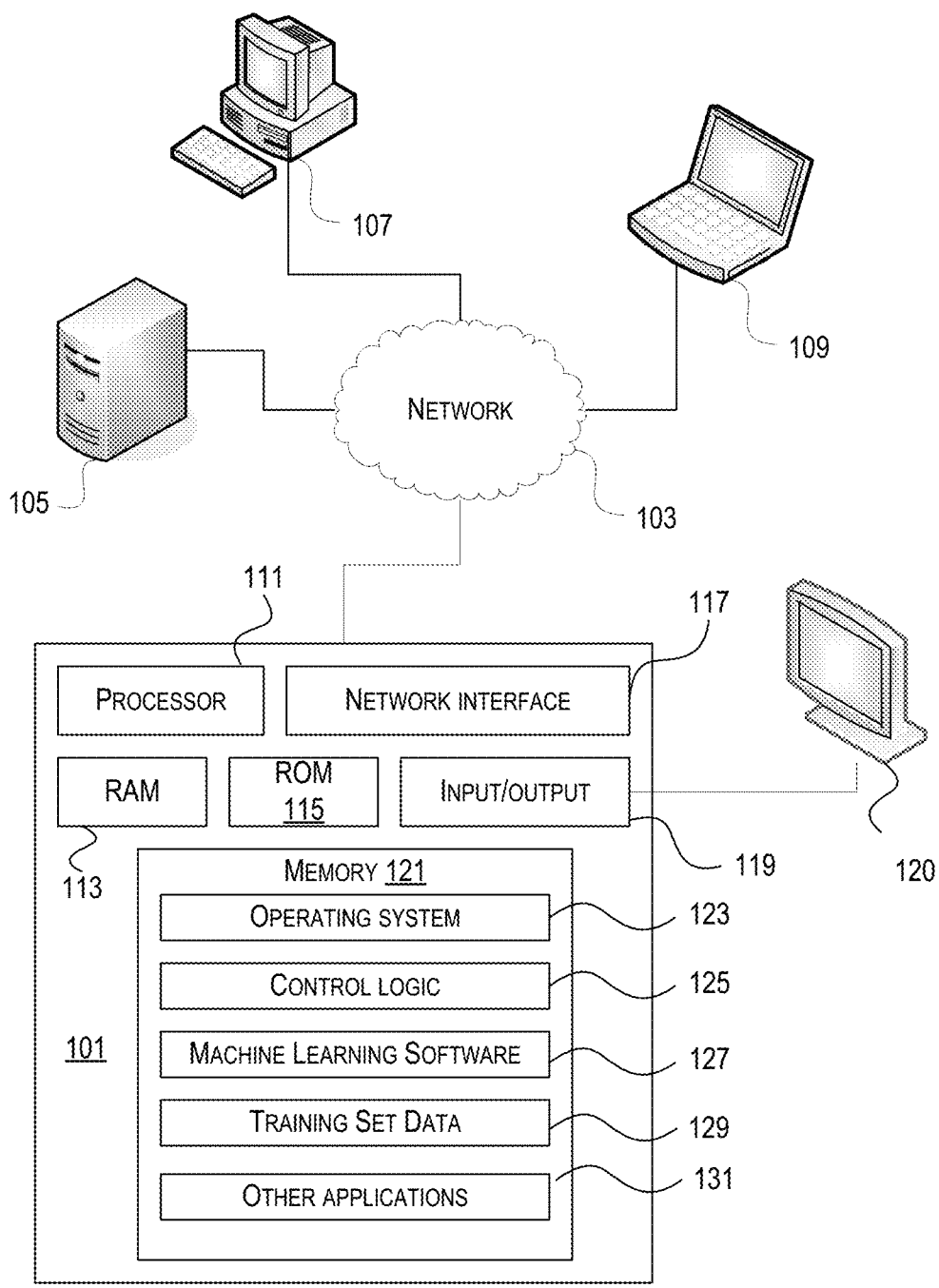
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for improving transaction security by dynamically generating and managing virtual transaction card numbers for use during in-person transactions. The aspects described herein leverage information about device location to dynamically generate virtual transaction card numbers for use with particular merchants (and, e.g., no other merchants). This allows shoppers to conduct significantly safer in-person transactions: after all, if a merchant point-of-sale device is compromised (and/or an employee of the merchant attempts to steal the card number used to conduct a transaction), only a limited-use, dynamically-generated virtual transaction card number will be stolen. In this manner, the stolen number can not only be readily traced back to the compromised merchant, but the stolen number cannot be used anywhere except for the compromised merchant, limiting the value of the number significantly.

As an example of how the present disclosure may operate, a shopper might walk into a store and begin to browse items. Around when the shopper walks into the store, an application on their smartphone might determine (e.g., using a GPS module) a location of the smartphone and, in turn, assume a location of the shopper. Based on the determined location of the smartphone, the smartphone might identify one or more nearby merchants, and select one of those merchants as a likely candidate where the shopper is located. Once that merchant is selected (that is, once the smartphone has determined a likely merchant where the shopper is located), the smartphone may request the generation of a virtual transaction card. That virtual transaction card might be uniquely generated for the merchant and usable at the merchant (and, e.g., no other merchants). That virtual transaction card might also have other limitations, such as being usable for only a certain period of time, being usable only when the smartphone is in a certain geographic region, or the like. The smartphone might then provide the virtual transaction card number to the shopper in a variety of ways. For example, the smartphone might transmit, to a credit card-like digital wallet device or similar second device, data about the virtual transaction card. As another example, the smartphone might cause the virtual transaction card to be stored in a digital wallet application of the smartphone. In this manner, if the shopper wishes to conduct a purchase at the merchant, the shopper can use the virtual transaction card to conduct the transaction, rather than using their usual physical credit card or debit card. In this manner, even if the virtual transaction card is somehow stolen (e.g., through a compromised point-of-sale system, merchant employee malfeasance, or the like), the data would be virtually useless for malicious use.

Aspects described herein improve the functioning of computers by improving computing security in circumstances where in-person transactions are conducted using certain computing devices (e.g., merchant point-of-sale devices, which are often old and are sometimes prone to security vulnerabilities). It is unfortunately increasingly common for malicious parties to use various techniques (e.g., card skimmers, software hacking) for the purposes of pilfering card data presented to a merchant, whether that information is provided to a point-of-sale system using a magnetic stripe, various chip-and-pin technologies, or the like. While efforts are being made to harden the technology used in point-of-sale systems, many merchants nonetheless use old point-of-sale systems with older hardware and software (and those merchants are sometimes not in a financial position to upgrade these systems). By using users' mobile devices to learn their location and dynamically generate virtual transaction cards, the security (or lack thereof) of point-of-sale systems becomes less of a concern: after all, even if a point-of-sale system is compromised, the use of a virtual transaction card lessens the value of any theft of information pertaining to that virtual transaction card. In other words, the aspects described herein address computer security by recognizing that, even where the security of particular computing devices (e.g., point-of-sale systems, merchant payment networks) might not be ideal in certain circumstances, the security processes of individual shoppers (and the data they provide to the aforementioned particular computing devices) can be improved through the dynamic generation of limited-use virtual transaction cards and the convenient deployment of such virtual transaction cards using devices that are commonly carried by and familiar to the shopper.

The aspects described herein are fundamentally directed to improvements in computer hardware and computer security, even though some portions of the disclosure provided herein describe financial transactions. In particular, the present disclosure improves the security of computing devices and computing device processing in a particular environment (e.g., one involving older point-of-sale systems and security risks often faced by those systems). Though some portions provided below illustrate aspects of security improvements by describing how a user might experience those security improvements at a merchant (e.g., in a store), this is not intended to suggest that any portion of the present disclosure or claims are directed to the overall concept of financial transactions (or the like).

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 131. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QOS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
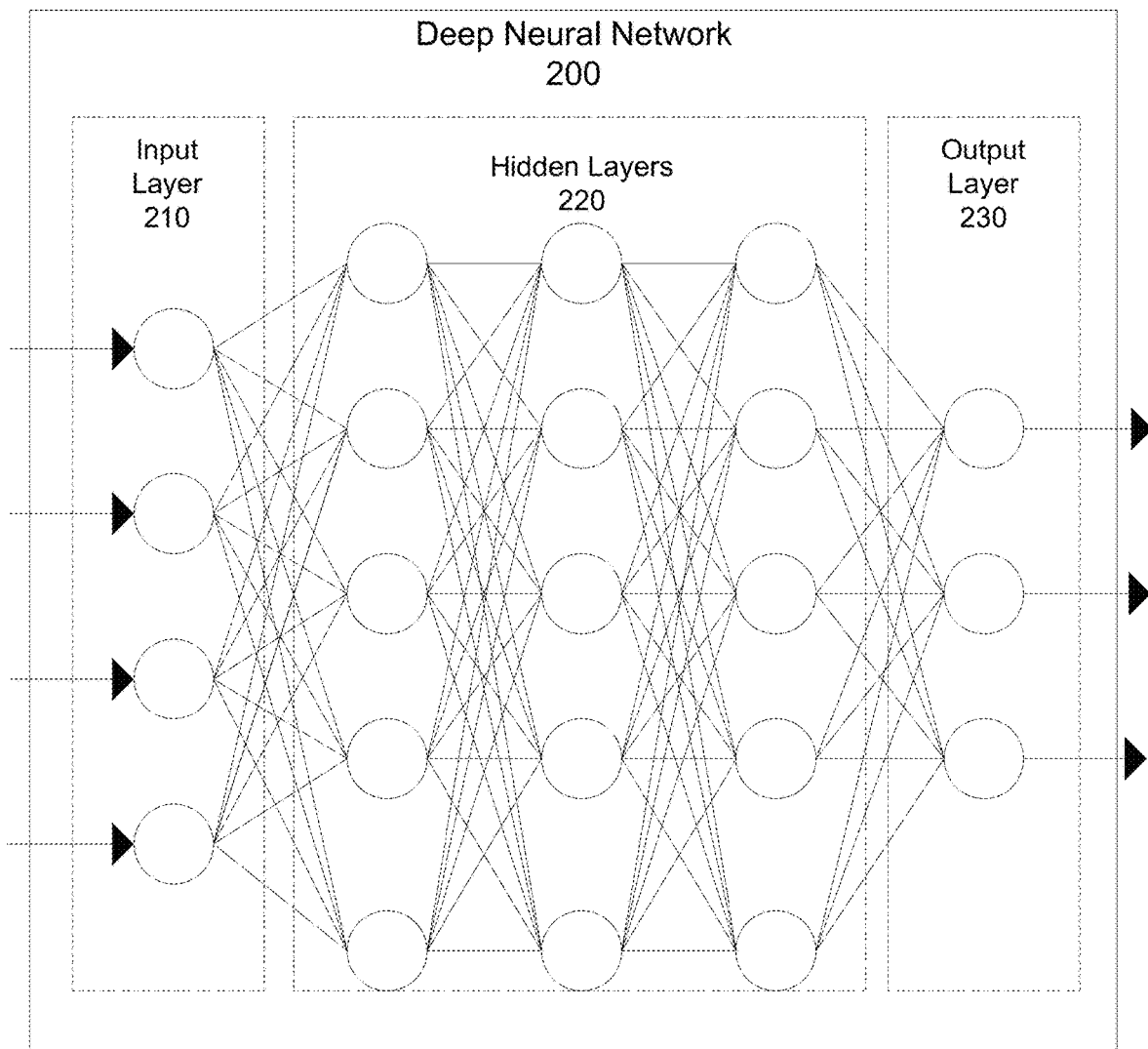
FIG. 2 depicts an example deep neural network architecture for a model according to one or more aspects of the disclosure.

FIG. 2 illustrates an example deep neural network architecture 200. Such a deep neural network architecture may be all or portions of the machine learning software 127 shown in FIG. 1. That said, the architecture depicted in FIG. 2 need not be performed on a single computing device, and may be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
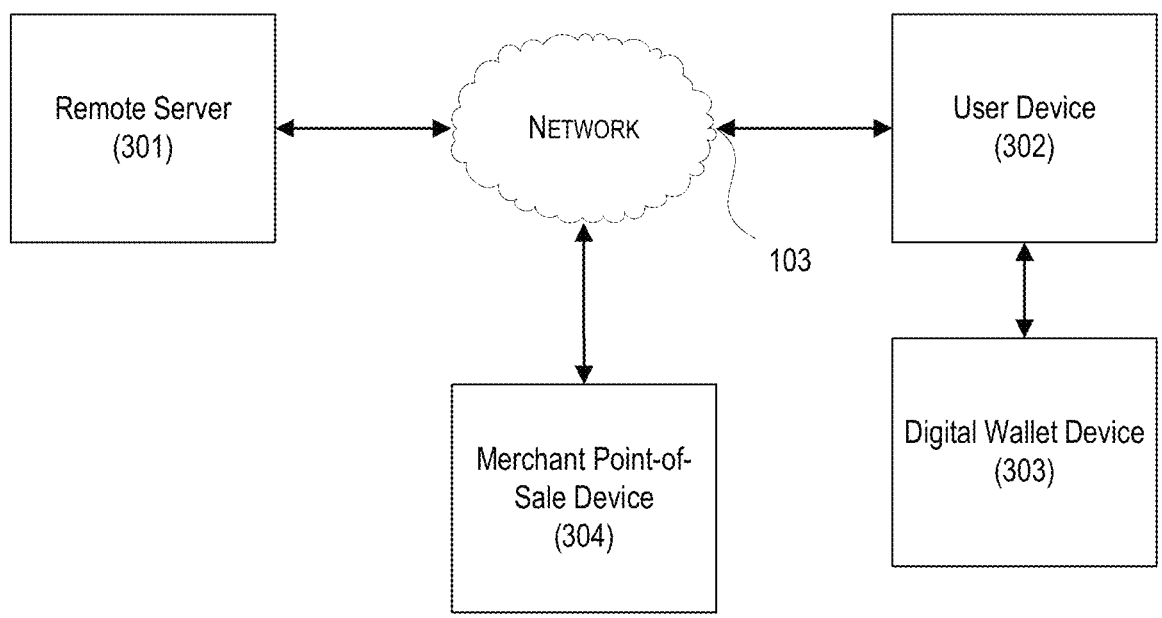
FIG. 3 depicts a system comprising different computing devices that may be used in implementing one or more aspects of the disclosure in accordance with one or more illustrative aspects discussed herein.

FIG. 3 depicts a system for conducting a transaction with a merchant point-of-sale device 304. Depicted as part of the system are the merchant point-of-sale device 304, which is communicatively coupled, via the network 103, to a remote server 301 and a user device 302. The user device 302 is shown as communicatively coupled to a digital wallet device 303. That said, the digital wallet device 303 might be omitted and/or combined with the user device 302 in certain circumstances (e.g., where the user device 302 executes a digital wallet application, such that the digital wallet device 303 is replaced by an application executing on the user device 302). Each element in FIG. 3 (including but not limited to the remote server 301, the user device 302, the digital wallet device 303, and/or the merchant point-of-sale device 304) may comprise one or more computing devices, such as described with respect to FIG. 1. For example, the user device 302 might comprise a smartphone, a laptop, a wearable such as a smartwatch, or the like.

The user device 302 may be configured to manage virtual transaction cards. For example, the user device 302 may be configured to request, from the remote server 301, one or more virtual transaction cards. Those requested one or more virtual transaction cards may be requested for one or more merchants, such that the one or more virtual transaction cards might be limited to the one or more merchants. Such a request may comprise, for example, information regarding the one or more merchants (e.g., a unique identifier of a merchant) and/or authentication details (e.g., a customer identifier, a username, a cryptographic token) associated with a user of the user device 302. The user device 302 may be additionally and/or alternatively configured to detect its location using one or more different location determination processes. For example, the user device 302 may comprise a GPS module that provides GPS coordinates indicating the location of the user device 302. As another example, the user device 302 may determine its location based on one or more wireless network access points to which it is connected. For instance, the user device 302 may triangulate its location based on signal strengths and/or round-trip times associated with wireless communications between the user device 302 and one or more wireless access points. As yet another example, the user device 302 might determine its location by capturing, using one or more cameras, images of an environment around the user device and processing the images to identify one or more indications of a location of the user device 302. This process might be performed to identify, for example, common symbols (e.g., corporate logos) associated with a particular merchant. As yet another example, the user device 302 might determine its location by capturing, using one or more microphones, audio from an environment around the user device and processing the audio to identify one or more indications of a location of the user device 302. The user device 302 might use a combination of location determination processes as part of determining its location. For example, the user device 302 might use a GPS module to identify GPS coordinates corresponding to its location, then use signal strengths and/or round-trip times to validate and/or further refine its location. As another example, the user device 302 might use the camera-based approach described above to determine a rough idea of its location, then use the audio-based approaches described above to further refine its determination of its location.

The remote server 301 may be configured to generate and provide virtual transaction cards. For example, the remote server 301 may be managed by a banking institution and may be apportioned a plurality of different virtual transaction cards which may be apportioned to different institution customers at different times. The remote server 301 may condition apportionment of such virtual transaction cards upon receipt of a request for virtual transaction cards that includes an indication of a particular merchant and/or authentication credentials. In this manner, the remote server 301 can associate a virtual transaction card to a particular merchant and/or a particular user (and, e.g., for a limited period of time). Along those lines, the remote server 301 may store, in a database, associations between virtual transaction cards, users, and/or merchants. Because the remote server 301 may condition apportionment of such virtual transaction cards upon receipt of a request for virtual transaction cards that includes authentication credentials, the remote server 301 may additionally and/or alternatively have access to one or more databases which store user authentication information. Using such information, the remote server 301 may authenticate a user before providing a user device, such as the user device 302, one or more virtual transaction cards. For example, a request for a virtual transaction card may comprise candidate authentication credentials (e.g., a username and password, biometric information, etc.) for a user, and the remote server 301 may compare the candidate authentication credentials with stored authentication credentials (e.g., a stored username and a stored hash of the password, stored biometric information, etc.) to determine whether the request is received from a legitimate user.

The remote server 301 might have access to only a limited quantity of virtual transaction cards. For example, because credit and debit card numbers might be limited to sixteen-digit numbers, virtual transaction card numbers might also be limited to sixteen-digit numbers such that the numbers may be provided to legacy point-of-sale systems. In practice, and considering other requirements for valid credit card numbers, this means that the remote server 301 might have access to only a handful (e.g., a few hundred thousand) possible virtual transaction card numbers. To address this issue, virtual transaction card numbers as assigned to particular users might expire over time, such that the same virtual transaction card number might be provided to two different shoppers at different times. That said, because a virtual transaction card may comprise more than just a virtual transaction card number (that is, the virtual transaction card might also comprise a card verification value, an expiration date, and the like), the likelihood that two shoppers end up using the same virtual transaction card is low.

The merchant point-of-sale device 304 may be any device that may be used to conduct a transaction, such as a purchase of goods and/or services at the merchant. For example, at a grocery store, the point-of-sale device 304 may comprise a credit card processing machine located in a check-out aisle of the grocery store. As another example, the merchant point-of-sale device 304 may comprise a vending machine on a street. With that said, the merchant point-of-sale device 304 need not be used for a mere purchase of goods and/or services, and may be involved in a different type of transaction. For example, the merchant point-of-sale device 304 may comprise an automated teller machine (ATM). The merchant point-of-sale device 304 may be capable of receiving transaction card data (whether data for a virtual transaction card or a physical transaction card) using a magnetic stripe reader, wireless communications technologies (e.g., Near-Field Communication ("NFC"), Wi-Fi, Bluetooth), an EMV chip-and-pin reader, or the like.

The digital wallet device 303 may be capable of storing and/or providing virtual transaction card information. In this manner, the digital wallet device 303 may be configured to store a plurality of different sets of virtual transaction card data, such that each of the plurality of different sets of virtual transaction card data corresponds to a different merchant of a plurality of merchants. For example, the digital wallet device 303 may comprise a credit card-sized device that can store, in memory, one or more sets of virtual transaction card data and enables use of those one or more sets of virtual transaction card data. The digital wallet device 303 may additionally and/or alternatively comprise a magnetic stripe that can transmit, though a swiping action through a point-of-sale device or similar action, all or portions of virtual transaction card data to the point-of-sale device. The digital wallet device 303 may additionally and/or alternatively comprise wireless communications functionality (e.g., Bluetooth, NFC, and/or Wi-Fi circuitry) that enables the digital wallet device 303 to wirelessly transmit all or portions of virtual transaction card data to the point-of-sale device.

Figure 4:
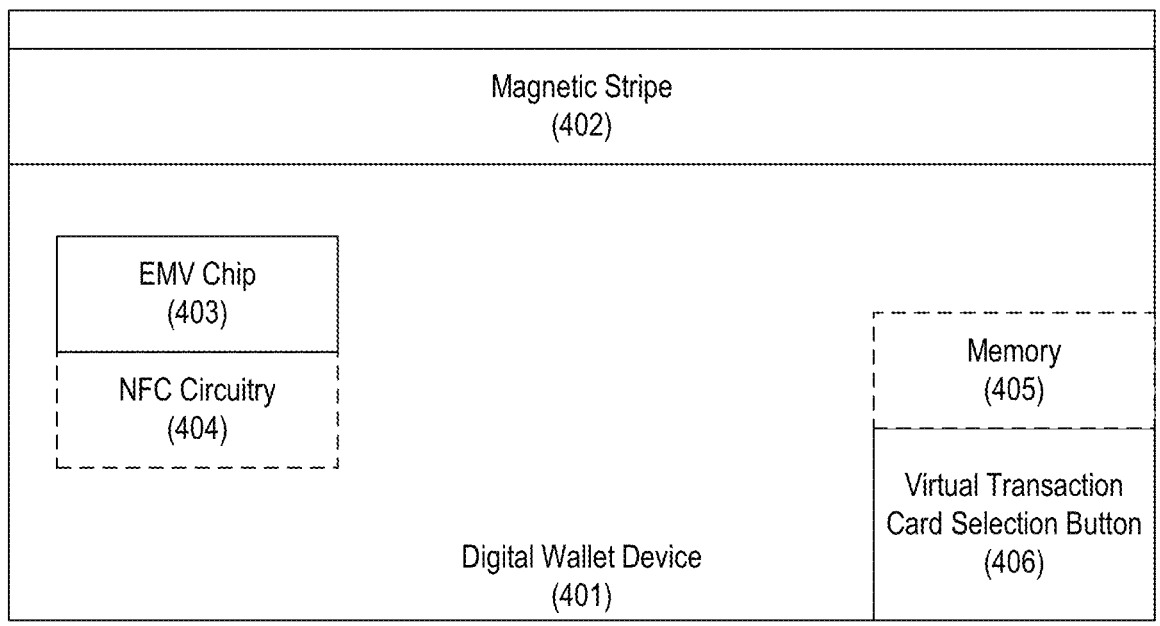
FIG. 4 depicts a digital wallet device.

One example of the digital wallet device 303 of FIG. 3 is the digital wallet device 401 of FIG. 4. FIG. 4 depicts a digital wallet device 401 comprising a magnetic stripe 402, an EMV chip 403, NFC circuitry 404, memory 405, and a virtual transaction card selection button 406. The digital wallet device 401 depicted in FIG. 4 might be substantially shaped and sized like a normal credit card. In this manner, the digital wallet device 401 might be used by individuals much like a normal credit card, though the digital wallet device 401 may in fact store a variety of different virtual transaction cards (e.g., different virtual transaction cards for different merchants).

The digital wallet device 401 may comprise appropriate circuitry to manage and provide access to one or more virtual transaction cards. For example, the digital wallet device 401 may comprise circuitry (e.g., appropriate electronic leads, batteries, processors, etc.) to store, in the memory 405, data corresponding to one or more virtual transaction cards. The virtual transaction card selection button 406 of the digital wallet device 401 may be used to select (e.g., iterate through) each of the one or more virtual transaction cards stored in the memory 405. The digital wallet device 401 may additionally and/or alternatively comprise a display or other form of output to indicate which of the one or more virtual transaction cards is currently selected by a user. Once selected by a user, data corresponding to a selected virtual transaction card may be implemented via the magnetic stripe 402, the EMV chip 403, and/or the NFC circuitry 404. For example, the data corresponding to a selected virtual transaction card may be implemented via the magnetic stripe 402 such that, if the digital wallet device 401 is swiped through a magnetic card reader of the merchant point-of-sale device 304, the data corresponding to a selected virtual transaction card is transmitted to the merchant point-of-sale device 304. As another example, the data corresponding to a selected virtual transaction card may be implemented via the EMV chip 403 such that, if the digital wallet device 401 is inserted into an EMV chip reader of the merchant point-of-sale device 304, the data corresponding to a selected virtual transaction card is transmitted to the merchant point-of-sale device 304. As another example, the data corresponding to a selected virtual transaction card may be implemented via the NFC circuitry 404 such that, if the digital wallet device 401 is placed nearby the merchant point-of-sale device 304, the data corresponding to a selected virtual transaction card is transmitted to the merchant point-of-sale device 304.

In some instances, the digital wallet device 401 may condition access to virtual transaction card data based on authentication credentials, unlock commands, or the like. For example, the user device 302 may cause the digital wallet device 401 to condition access to virtual transaction card data based on entry of authentication credentials via an input (e.g., a pin pad, a biometric input device) of the digital wallet device 401. As another example, the digital wallet device 401 may be configured to remain in a locked and unavailable state (e.g., such that it does not provide virtual transaction card data via the magnetic stripe 402, the EMV chip 403, and/or the NFC circuitry 404) until an unlock command is received from a different device, such as user device 302. Such an unlock command may be time- and/or geography-limited, such that the digital wallet device 401 might be unlocked for only a period of time and/or only within a certain geographic area.

Figure 5:
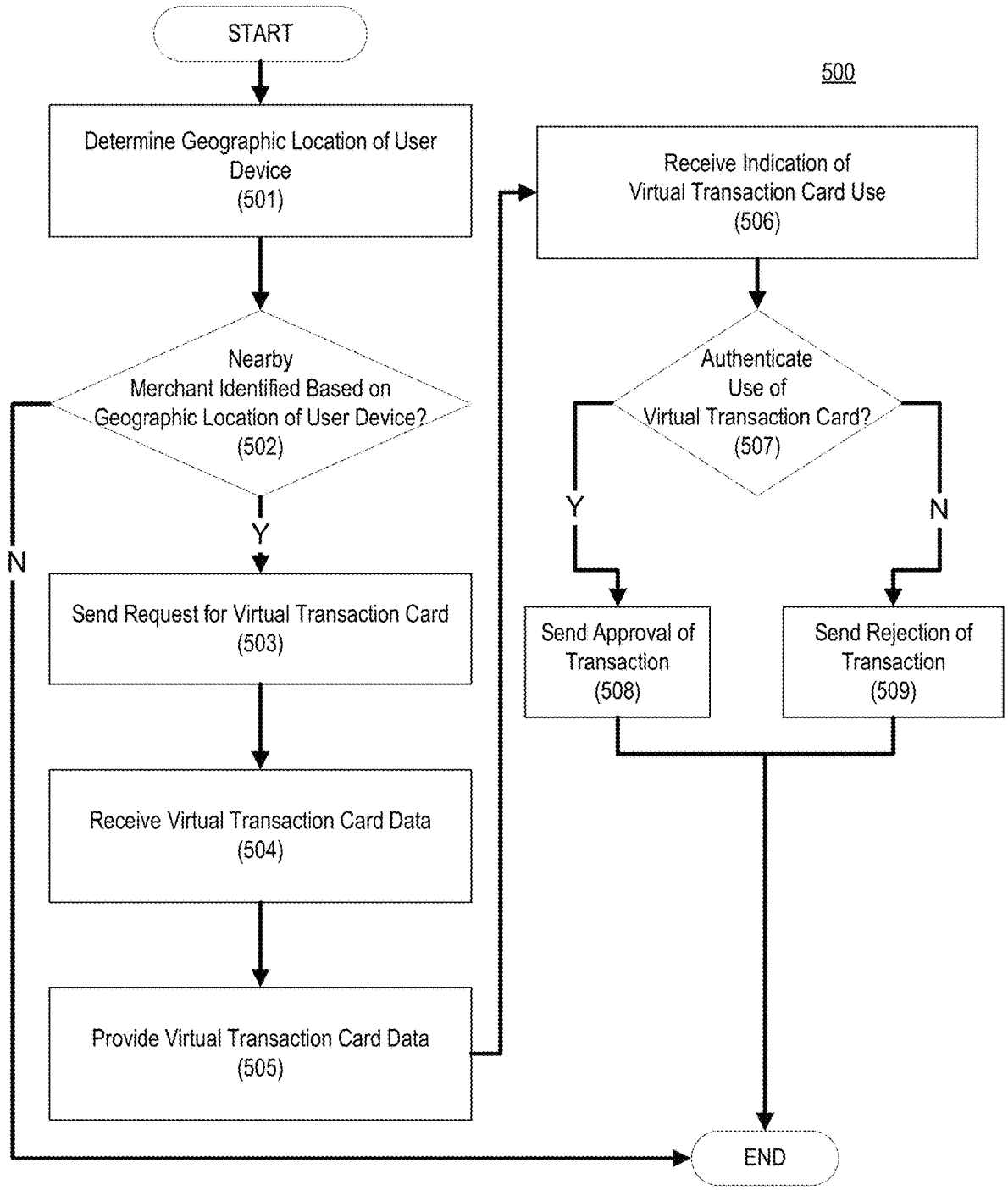
FIG. 5 depicts a flow chart comprising steps which may be performed for dynamically generating and managing virtual transaction cards.

FIG. 5 illustrates an example method 500 for managing virtual transaction cards in accordance with one or more aspects described herein. The method 500 may be implemented by a suitable computing system, as described further herein. For example, the method 500 may be implemented by any suitable computing environment by a computing device and/or combination of computing devices, such as one or more of the computing devices 101, 105, 107, and 109 of FIG. 1, and/or any computing device comprising one or more processors and memory storing instructions that, when executed by the one or more processors, cause the performance of one or more of the steps of FIG. 5. The method 500 may be implemented in suitable program instructions, such as in machine learning software 127, and may operate on a suitable training set, such as training set data 129. The method 500 may be implemented by one or more non-transitory computer-readable media that stores instructions that, when executed, cause performance of all or portions of the method 500. The steps shown in the method 500 are illustrative, and may be re-arranged or otherwise modified as desired.

In step 501, a geographic location of a user device, such as the user device 302, may be determined. Determining the geographic location of a user device may be performed in a variety of ways. In some circumstances, such as where the user device 302 contains appropriate GPS module(s), determining a location of the user device 302 may be performed using GPS techniques. For example, the user device 302 may determine, using a GPS module of the user device, a geographic location of the mobile device. The location of a user device, such as the user device 302, may be additionally and/or alternatively performed using other methods. For example, the location of the user device 302 may be determined based on one or more wireless access points to which the user device 302 is connected. More particularly, based on one or more signal strengths corresponding to one or more wireless connections between the user device 302 and one or more access points, the location of the user device 302 may be determined. Similarly, based on one or more round trip times corresponding to one or more wireless connections between the user device 302 and one or more access points, the location of the user device 302 may be determined. In either or both cases, determining the location of the user device 302 may be based on triangulation based on signal strengths and/or round trip times, such as in circumstances where the user device 302 is in communication with three different wireless access points. Such a strategy might be particularly useful where GPS signal(s) are weak, but where merchant(s) provide free Wi-Fi or similar wireless networks.

In step 502, it is determined whether a merchant nearby the geographic location of the user device can be identified. This process may entail determining a plurality of different merchants located proximate to the geographic location of the user device, then selecting one of those plurality of different merchants. For example, the user device 302 may identify a first merchant by determining one or more merchants proximately located to the geographic location of the mobile device and selecting, from the one or more merchants, the first merchant. Such an approach might be particularly useful (if not outright necessary) in circumstances where multiple merchants might be present in the same or similar locations, such as in a mall, food court, or similar setting: after all, the difference between a user of the user device 302 shopping at one store versus another might be a difference of no more than a few feet.

As part of selecting the first merchant, a location of the user device 302 may be compared to similar information corresponding to one or more merchants. This process may involve determining whether a location of the user device 302 is potentially correlated with a location corresponding to the first merchant. For example, and as discussed above with respect to step 501, as part of selecting the first merchant, the user device 302 may consider a signal strength associated with communications between the mobile device and a wireless access point and/or a round trip time associated with the communications between the mobile device and the wireless access point. To provide a more particular example, the user device 302 might compare expected signal strengths at a particular merchant to measured signal strengths of the user device 302 to determine a likelihood that the user device 302 is located at the particular merchant. Similarly, the user device 302 might compare expected round-trip times at a particular merchant to measured signal strengths of the user device 302 to determine a likelihood that the user device 302 is located at the particular merchant.

As part of selecting the first merchant, the user device 302 may consider geofencing associated with the first merchant. A merchant may be associated with particular geofencing, such as a particular geographic perimeter. As such, as part of determining whether the user device 302 is at a first merchant, it may be determined whether the user device 302 is within a particular geographic perimeter associated with the merchant.

Selecting a merchant may comprise use of a machine learning model, such as that which may be implemented using the deep neural network 200 depicted in FIG. 2. A machine learning model may be trained using training data that correlates location information (e.g., GPS coordinates, wireless signal strengths, wireless packet round-trip times, or the like) with merchants (e.g., whether the particular GPS coordinates, wireless signal strengths, wireless packet round-trip times, or the like correspond to one or more merchants). Later, and as part of step 502, the trained machine learning model may be provided input data comprising new location information (e.g., new GPS coordinates, wireless signal strengths, and/or wireless packet round-trip times). The trained machine learning model may then provide, as output, an indication as to whether the new location information corresponds to one or more merchants. That output may be used to identify and/or otherwise select a merchant from a plurality of merchants. For instance, output from the trained machine learning model may be used in circumstances where GPS coordinates alone do not readily indicate which merchant of a plurality of merchants a user is likely to be shopping at.

In step 503, a request for a virtual transaction card may be sent. The request for the virtual transaction card might be transmitted in response to determining that the user device 302 is at one or more locations associated with a merchant. That request may be sent to a different computing device, such as the remote server 301. For example, the user device 302 may send, to a remote server such as the remote server 301, a request for a virtual transaction card. The request for the virtual transaction card may comprise data that enables the recipient to generate a virtual transaction card for a particular user and/or for a particular merchant. For example, the request for the virtual transaction card may comprise an indication of the first merchant (e.g., a unique identifier of the first merchant) and authentication credentials corresponding to a user associated with the mobile device (e.g., a username and password provided by the user, a unique cryptographic token assigned to the user, biometric information, or the like).

In step 504, virtual transaction card data may be received. The virtual transaction card data may be received in response to the request in step 503. For example, the user device 302 may receive, from the remote server (such as the remote server 301) and in response to the request, virtual transaction card data that comprises a virtual transaction card number corresponding to the first merchant.

Virtual transaction card data may comprise some or all of the type of information used in physical transaction cards, such as credit cards and debit cards. For example, the virtual transaction card data may comprise a virtual transaction card number, such as a sixteen-digit credit card number. The virtual transaction card data may additionally and/or alternatively comprise an expiration date corresponding to the sixteen-digit credit card number, a card verification value corresponding to the sixteen-digit credit card number, and/or a zip code corresponding to the sixteen-digit credit card number. Such similarity to physical transaction cards might be desirable because, for example, the merchant point-of-sale device 304 might require such information to complete a transaction. As such, in some circumstances, the virtual transaction card data may be configured to be used at a point-of-sale device, such as the merchant point-of-sale device 304, as if it corresponded to a credit card or debit card.

In step 505, the virtual transaction card data may be provided to a recipient, such as a second device and/or a digital wallet application. For instance, the virtual transaction card data may be provided to a second device, such as the digital wallet device 303, and/or a digital wallet application executing on the computing device that received the virtual transaction card data in step 504. In this manner, the virtual card transaction data may be made available to a user for use in future transactions. For example, the user device 302 may provide the virtual transaction card data to a second device, and that second device may be configured to be used with one or more point-of-sale systems associated with a first merchant to conduct one or more transactions with the first merchant.

As part of providing the virtual transaction card data, the virtual transaction card data might be transmitted to a second device. For example, as part of providing the virtual transaction card data to a second device such as the digital wallet device 303, the user device 302 may instantiate a wireless connection between the mobile device and the second device and send, via the wireless connection, the virtual transaction card data. This approach might be useful in part because it might not require affirmative action by a user. For example, simply by virtue of a user walking into a store, steps 501-505 might be performed, and virtual transaction card data might be quickly wirelessly transmitted and preloaded onto the digital wallet device 303, meaning that the digital wallet device 303 might be relatively quickly configured for use at a particular merchant without significant involvement of a user.

The virtual transaction card data might expire, such that the virtual transaction card data might be rescinded and/or otherwise deleted after a period of time. Such a process might be implemented for security reasons (e.g., to ensure that virtual transaction cards are valid only for a short period of time), but also to allow the re-use of virtual transaction card numbers (particularly in circumstances where only a relatively small number of permutations of virtual transaction card numbers are available). Along those lines, the user device 302 may receive an indication of virtual card expiry from the remote server 301 and transmit deletion instructions to the digital wallet device 303. For example, the user device 302 may receive, from the remote server, an indication that the virtual transaction card data has expired, and may send, to the second device, an instruction to delete the virtual transaction card data.

One or more computing devices, such as the digital wallet device 303, may be configured to unlock (e.g., automatically unlock) and be available when a user is in a physical location associated with a particular merchant. For example, after the virtual transaction card has been generated, the user device 302 may determine, using a GPS module of the user device 302, an updated geographic location of the user device 302. Such an updated geographic location might be updated insofar as, for example, some quantity of time (e.g., seconds, minutes, even days or years) elapsed between the determination of the updated geographic location and the determination of the geographic location in step 501. Then, based on comparing the updated geographic location of the user device 302 with a second geographic location associated with the first merchant, the user device 302 may send, to a second device such as the digital wallet device 303, an unlock command that enables use, via the second device and during a predetermined period of time, of the virtual transaction card data. Such an unlocking might be conditioned on the second device storing virtual transaction card data corresponding to the first merchant. In this manner, as a user enters a particular merchant (e.g., a particular grocery store), if the digital wallet device 303 contains virtual transaction card data corresponding to that particular merchant, the digital wallet device 303 might be caused to be unlocked and made ready for transactions, using the virtual transaction card data, at that particular merchant.

In step 506, an indication of virtual transaction card use may be received. For example, the user device 302 may receive some indication that the virtual transaction card is being used to conduct a transaction, and/or that a user might soon use the virtual transaction card for the purposes of conducting one or more transactions. The indication of the virtual transaction card use may comprise a request to use the virtual transaction card data (e.g., a user providing some input via the user device 302 and/or the digital wallet device 303 indicating a request to unlock the digital wallet device 303), and/or an indication that the virtual transaction card data has been used. For example, the user device 302 may receive, from the remote server (e.g., the remote server 301), a notification that the second device has provided the virtual transaction card data to a first point-of-sale system associated with the first merchant as part of a first transaction. As another example, the user device 302 may receive, from a second source (e.g., the digital wallet device 303 and/or a digital wallet application), a request to use the virtual transaction card data.

In step 507, it may be determined whether to authenticate use of the virtual transaction card, whether in the context of authenticating use of the virtual transaction card for a particular transaction and/or in the context of authenticating future use of the virtual transaction card to conduct one or more future transactions. Determining whether to authenticate use of the virtual transaction card may be based on a variety of factors, including user input and GPS information. For example, the user device 302 may receive, via a user interface provided by the mobile device, user input indicating that a requested transaction is legitimate and, on the basis of that user input, decide to authorize use of the virtual transaction card to conduct that requested transaction. That said, if the user input indicated that the requested transaction was not legitimate, the user device 302 may decide to not authorize use of the virtual transaction card to conduct the requested transaction. That said, the user input need not relate to approving a particular transaction, but might instead unlock a second device, such as the digital wallet device 303, for one or more future transactions. For example, the user device 302 may receive, via a user interface provided by the mobile device, user input indicating whether to unlock the second device. Once unlocked, the second device might be used to conduct a wide variety of future transactions. As another example, the user device 302 may determine, using an GPS module of the user device 302, an updated geographic location of the mobile device and, based on that updated geographic location, decide whether to authenticate use of the virtual transaction card with respect to one or more transactions. In this manner, for instance, the user device 302 might permit transactions at a merchant and using the virtual transaction card when the user device 302 is in a particular geographic region associated with the merchant, but might deny transactions at the merchant and using the virtual transaction card when the user device 302 is not in the particular geographic region.

Determining whether to authenticate the use of the virtual transaction card may comprise use of a machine learning model, such as that which may be implemented using the deep neural network 200 depicted in FIG. 2. A machine learning model may be trained to identify fraudulent transactions based on training data comprising correlations between card transaction data (e.g., historical transactions conducted using physical and/or virtual transaction cards) and whether each transaction of the card transaction data was later determined to be fraudulent. Then, the trained machine learning model may be provided input data comprising an indication of a requested transaction, requested by a user, associated with the virtual transaction card. The trained machine learning model may output, in response to the input data, an indication as to whether the requested transaction is likely to be fraudulent. In turn, the user device 302 may determine whether to authenticate the use of the virtual transaction card based on the trained machine learning model output.

In step 508, if it is determined to authenticate use of the virtual transaction card, an approval of a transaction may be transmitted. For example, the user device 302 may send an indication that the first transaction is legitimate to the remote server 301. This may cause the remote server 301 to approve the transaction. As another example, returning to the updated geographic location example provided above, the user device 302 may, based on comparing the updated geographic location of the mobile device with a second geographic location associated with the first merchant, send, to a second device such as the digital wallet device 303, an indication that the second device is approved to use the virtual transaction card data. This may cause the second device, such as the digital wallet device 303, to enable use of virtual transaction card data (e.g., by enabling transmission of data via the magnetic stripe 402, the EMV chip 403, and/or the NFC circuitry 404). As another example, where the user input indicates that a second device (e.g., the digital wallet device 303) should be unlocked, the user device 302 may unlock the second device by transmitting appropriate instructions to the second device. For instance, the user device 302 may, based on user input, send, to the second device, an unlock command that enables use, via the second device and during a predetermined period of time, of the virtual transaction card data.

In step 509, if it is determined to not authenticate use of the virtual transaction card, a rejection of a transaction may be transmitted. Such a rejection might comprise not permitting a second device (e.g., the digital wallet device 303) to be unlocked and used for one or more transactions, and/or a transmission that prevents completion of a particular transaction.

As indicated above, all or portions of FIG. 5 may be implemented in a circumstance where, instead of the digital wallet device 303, a digital wallet application executing on the user device 302 may be configured to use virtual transaction cards. In such a circumstance, functionality of the user device 302 (e.g., NFC functionality, Bluetooth functionality, or the like) may be used to transmit virtual transaction card data. This may limit the number of devices that a user is required to manage overall, and simplify the overall virtual transaction card process somewhat. That said, it should be noted that, because most smartphones and similar devices lack magnetic strips, such devices might not be usable in some legacy point-of-sale systems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile device configured to manage virtual financial cards that are each uniquely generated for a different merchant, the mobile device comprising:
   one or more processors;
   a global positioning system (GPS) module; and
   memory storing instructions that, when executed by one or more processors, cause the mobile device to:
      determine, using the GPS module, a geographic location of the mobile device;
      capture environment data by one or more of:
         capturing, using a camera of the mobile device, one or more images of an environment around the mobile device; or
         capturing, using a microphone of the mobile device, audio of the environment around the mobile device;
      identify a first merchant by:
         determining one or more merchants proximately located to the geographic location of the mobile device;
         processing the environment data using a trained machine learning model to identify at least one merchant; and
         selecting, based on the processed environment data and from the one or more merchants, the first merchant;
      send, to a remote server, a request for a virtual transaction card, wherein the request for the virtual transaction card comprises an indication of the first merchant and first authentication credentials corresponding to a user associated with the mobile device;
      receive, from the remote server and in response to the request, virtual transaction card data that comprises a virtual transaction card number corresponding to the first merchant;
      cause a digital wallet device different from the mobile device to store the virtual transaction card data in memory;
      receive a virtual transaction card unlock command comprising second authentication credentials; and
      based on validating the second authentication credentials, cause the digital wallet device to provide the virtual transaction card data via one or more of a magnetic stripe, an EMV chip, or NFC circuitry, wherein the virtual transaction card data is usable with one or more point-of-sale systems associated with the first merchant to conduct one or more transactions with the first merchant.

2. The mobile device of claim 1, wherein the instructions, when executed by the one or more processors, further cause the mobile device to:
   receive, from the remote server, a notification that the digital wallet device has provided the virtual transaction card data to a first point-of-sale system associated with the first merchant as part of a first transaction;
   receive, via a user interface provided by the mobile device, user input indicating that the first transaction is legitimate; and
   send an indication that the first transaction is legitimate to the remote server.

3. The mobile device of claim 1, wherein the instructions, when executed by the one or more processors, further cause the mobile device to:
   receive, from the digital wallet device, a request to use the virtual transaction card data;
   determine, using the GPS module, an updated geographic location of the mobile device; and
   based on comparing the updated geographic location of the mobile device with a second geographic location associated with the first merchant, send, to the digital wallet device, an indication that the digital wallet device is approved to use the virtual transaction card data.

4. The mobile device of claim 1, wherein the instructions, when executed by the one or more processors, further cause the mobile device to:
   receive, from the digital wallet device, a request to use the virtual transaction card data;
   receive, via a user interface provided by the mobile device, user input indicating whether to unlock the digital wallet device; and
   based on the user input, send, to the digital wallet device, the virtual transaction card unlock command.

5. The mobile device of claim 1, wherein the instructions, when executed by the one or more processors, further cause the mobile device to:
   receive, from the remote server, an indication that the virtual transaction card data has expired; and
   send, to the digital wallet device, an instruction to delete the virtual transaction card data.

6. The mobile device of claim 1, wherein the instructions, when executed by the one or more processors, further cause the mobile device to provide the virtual transaction card data to the digital wallet device by causing the mobile device to:
   instantiate a wireless connection between the mobile device and the digital wallet device; and
   send, via the wireless connection, the virtual transaction card data.

7. The mobile device of claim 1, wherein the virtual transaction card number corresponding to the first merchant comprises a sixteen-digit credit card number, and wherein the virtual transaction card data further comprises one or more of:
   an expiration date corresponding to the sixteen-digit credit card number,
   a card verification value corresponding to the sixteen-digit credit card number, or a zip code corresponding to the sixteen-digit credit card number.

8. The mobile device of claim 1, wherein the instructions, when executed by the one or more processors, further cause the mobile device to:
   determine, using the GPS module, an updated geographic location of the mobile device; and
   based on comparing the updated geographic location of the mobile device with a second geographic location associated with the first merchant, send, to the digital wallet device, the virtual transaction card unlock command.

9. The mobile device of claim 1, wherein the instructions, when executed by the one or more processors, further cause the mobile device to provide the virtual transaction card data to the digital wallet device by causing the mobile device to:
   cause the digital wallet device to condition access to the virtual transaction card data based on entry of third authentication credentials via an input of the digital wallet device.

10. The mobile device of claim 1, wherein the digital wallet device is configured to store a plurality of different sets of virtual transaction card data, wherein each of the plurality of different sets of virtual transaction card data corresponds to a different merchant of a plurality of merchants.

11. The mobile device of claim 1, wherein the instructions, when executed by the one or more processors, further cause the mobile device to select the first merchant based on one or more of:
   a signal strength associated with communications between the mobile device and a wireless access point;
   a round trip time associated with the communications between the mobile device and the wireless access point; or
   geofencing associated with the first merchant.

12. A method for managing virtual financial cards that are each uniquely generated for a different merchant, the method comprising:
   determining, via a global positioning system (GPS) module, a geographic location of a mobile device;
   capturing environment data by one or more of:
      capturing, using a camera of the mobile device, one or more images of an environment around the mobile device; or
      capturing, using a microphone of the mobile device, audio of the environment around the mobile device;
   identifying a first merchant by:
      determining one or more merchants proximately located to the geographic location of the mobile device;
      processing the environment data using a trained machine learning model to identify at least one merchant and
      selecting, based on the processed environment data and from the one or more merchants, the first merchant;
   sending, to a remote server, a request for a virtual transaction card, wherein the request for the virtual transaction card comprises an indication of the first merchant and first authentication credentials corresponding to a user associated with the mobile device;
   receiving, from the remote server and in response to the request, virtual transaction card data that comprises a virtual transaction card number corresponding to the first merchant; and
   causing a digital wallet device different from the mobile device to store the virtual transaction card data in memory;
   receive a virtual transaction card unlock command comprising second authentication credentials; and
   based on validating the second authentication credentials, cause the digital wallet device to provide the virtual transaction card data via one or more of a magnetic stripe, an EMV chip, or NFC circuitry, wherein the virtual transaction card data is usable with one or more point-of-sale systems associated with the first merchant to conduct one or more transactions with the first merchant.

13. The method of claim 12, further comprising:
   receiving, from the remote server, a notification that the digital wallet device has provided the virtual transaction card data to a first point-of-sale system associated with the first merchant as part of a first transaction;
   receiving, via a user interface provided by the mobile device, user input indicating whether the first transaction is legitimate; and
   sending an indication of whether the first transaction is legitimate to the remote server.

14. The method of claim 12, further comprising:
   receiving, from the digital wallet device, a request to use the virtual transaction card data;
   determining, using the GPS module, an updated geographic location of the mobile device; and
   based on comparing the updated geographic location of the mobile device with a second geographic location associated with the first merchant, sending, to the digital wallet device, an indication that the digital wallet device is approved to use the virtual transaction card data.

15. The method of claim 12, further comprising:
   receiving, from the digital wallet device, a request to use the virtual transaction card data;
   receiving, via a user interface provided by the mobile device, user input indicating whether to unlock the digital wallet device; and
   based on the user input, sending, to the digital wallet device, the virtual transaction card unlock command.

16. The method of claim 12, further comprising:
   receiving, from the remote server, an indication that the virtual transaction card data has expired; and
   sending, to the digital wallet device, an instruction to delete the virtual transaction card data.

17. One or more non-transitory computer-readable media storing instructions that, when executed by one or more processors of a mobile device, cause the mobile device to:
   determine, using a global positioning system (GPS) module, a geographic location of the mobile device;
   capture environment data by one or more of:
      capturing, using a camera of the mobile device, one or more images of an environment around the mobile device: or
      capturing, using a microphone of the mobile device, audio of the environment around the mobile device;
   identify a first merchant by:
      determining one or more merchants proximately located to the geographic location of the mobile device;
      processing the environment data using a trained machine learning model to identify at least one merchant; and
      selecting, based on the processed environment data and from the one or more merchants, the first merchant;

send, to a remote server, a request for a virtual transaction card, wherein the request for the virtual transaction card comprises an indication of the first merchant and first authentication credentials corresponding to a user associated with the mobile device;

receive, from the remote server and in response to the request, virtual transaction card data that comprises a virtual transaction card number corresponding to the first merchant;

cause a digital wallet device different from the mobile device to store the virtual transaction card data in memory;

receive a virtual transaction card unlock command comprising second authentication credentials; and based on validating the second authentication credentials, cause the digital wallet device to provide the virtual transaction card data via one or more of a magnetic stripe, an EMV chip, or NFC circuitry, wherein the virtual transaction card data is usable with one or more point-of-sale systems associated with the first merchant to conduct one or more transactions with the first merchant.

18. The one or more non-transitory computer-readable media of claim 17, wherein the instructions, when executed by the one or more processors, further cause the mobile device to:

receive, from the remote server, a notification that the digital wallet device has provided the virtual transaction card data to a first point-of-sale system associated with the first merchant as part of a first transaction;

receive, via a user interface provided by the mobile device, user input indicating whether the first transaction is legitimate; and send an indication of whether the first transaction is legitimate to the remote server.

19. The one or more non-transitory computer-readable media of claim 17, wherein the instructions, when executed by the one or more processors, further cause the mobile device to:

receive, from the digital wallet device, a request to use the virtual transaction card data;

determine, using the GPS module, an updated geographic location of the mobile device; and based on comparing the updated geographic location of the mobile device with a second geographic location associated with the first merchant, send, to the digital wallet device, an indication that the digital wallet device is approved to use the virtual transaction card data.

20. The one or more non-transitory computer-readable media of claim 17, wherein the instructions, when executed by the one or more processors, further cause the mobile device to:

receive, from the digital wallet device, a request to use the virtual transaction card data;

receive, via a user interface provided by the mobile device, user input indicating whether to unlock the digital wallet device; and based on the user input, send, to the digital wallet device, the virtual transaction card unlock command.

* * * * *